Nov. 10, 1953  H. FUTTER  2,658,476
ALL WEATHER SALT BLOCK
Filed March 7, 1951  2 Sheets-Sheet 1
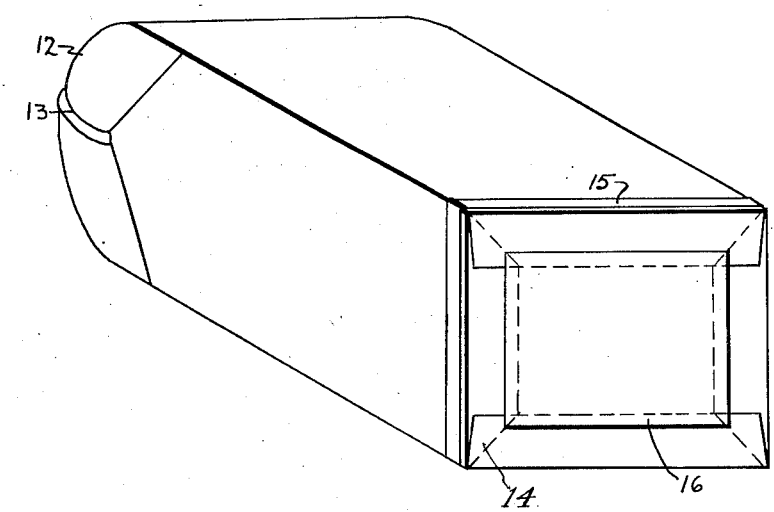
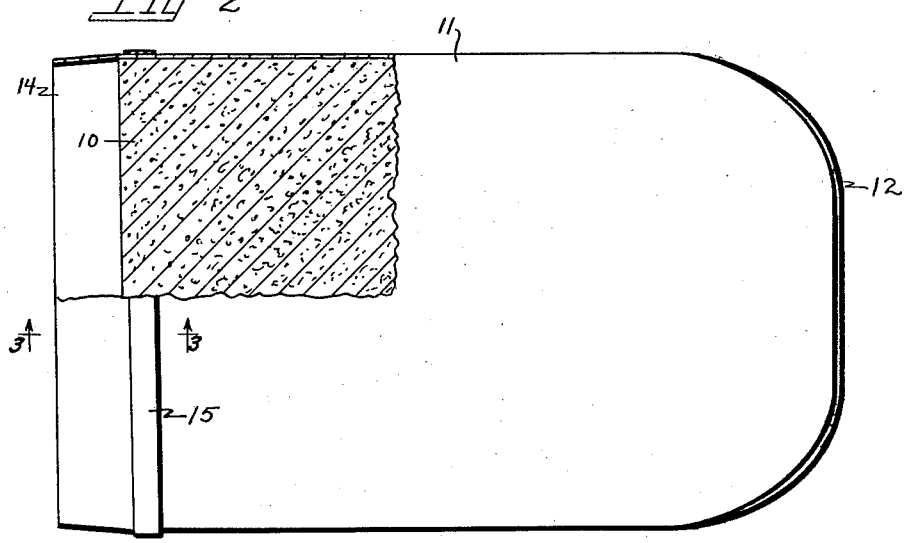
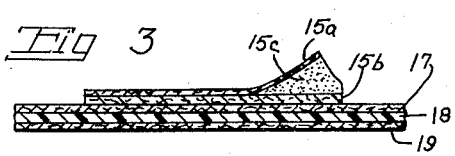
INVENTOR.
Homer Futter
BY
Atty.

Nov. 10, 1953  H. FUTTER  2,658,476
ALL WEATHER SALT BLOCK
Filed March 7, 1951  2 Sheets-Sheet 2
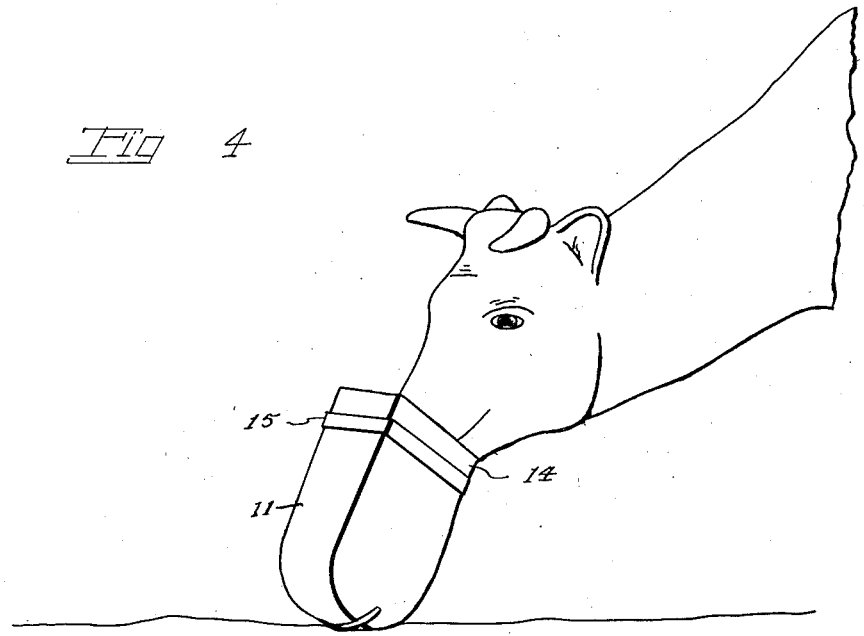
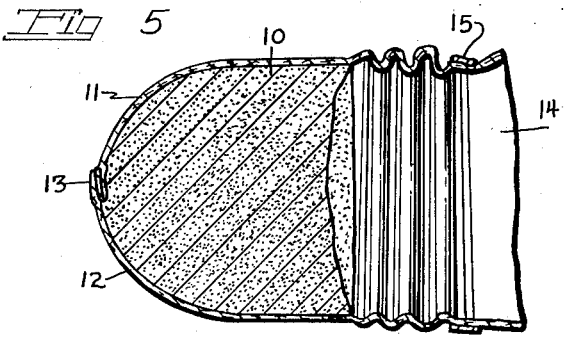
INVENTOR.
Homer Futter
BY
Atty.

Patented Nov. 10, 1953

2,658,476

UNITED STATES PATENT OFFICE 2,658,476

ALL WEATHER SALT BLOCK

Homer Futter, Spokane, Wash.

Application March 7, 1951, Serial No. 214,421

7 Claims. (Cl. 119—51)

My invention relates to salt blocks and has for its principal object the provision of a salt block unit which is protected from waste in handling and from the damaging effects of rain, snow etc. in the field and which keeps the salt accessible to the livestock at all times.

It is the common practice at present to put salt in the field or on the range in the form of blocks so that the livestock may lick the salt and obtain the amount necessary to satisfy their needs.

The ordinary salt blocks used on the range heretofore are made quite hard in order to keep them from leaching when rain and snow fall on them. They are also made hard to keep them from breaking in shipment and handling. These blocks are often so hard that the livestock do not get all the salt needed. Evidence is often found that the blocks are not furnishing enough salt because the cattle are found chewing on wood and rocks and hunting for more salt. Other substances, such as iodine, are now included in the blocks. Some of these substances are almost entirely wasted in the exposed blocks because the substances leach out faster than the basic salt. Some of these substances are adversely affected by direct sunlight. The blocks now commonly used provide no protection for such substances.

According to my invention I provide a salt block comprising plain salt, or salt with various other minerals and trace elements needed by the livestock, with a novel covering which protects the salt from the weather without interfering with its use by the livestock. A distinct advantage obtained is that the usable mineral content is protected against loss during shipping and handling so that, practically speaking, all of the material in the original block reaches the field. The ordinary salt blocks now available are broken and eroded during handling so that a substantial percentage of the original amount of salt never reaches the field.

Another purpose of the invention is to provide a novel block comprising salt and other minerals for use by livestock in the field in combination with a weather proof covering so constructed that the covering will withstand the abuse of the livestock in getting at the salt, and the salt will be available through one open end of the covering, the other end of the block being so shaped as to prevent the block from remaining in a position with the open end up.

The nature and advantages of the invention will appear more fully from the following description and the accompanying drawings illustrating a preferred form of the invention. The drawings and description are illustrative only, however, and are not intended to limit the invention except insofar as it is limited by the claims.

In the drawings:

Figure 1 is a perspective view of a block embodying my invention as it appears in shipping condition;

Figure 2 is a view in side elevation of the block shown in Figure 1 with the end of the block open, a portion of the covering being broken away to show the salt within the covering;

Figure 3 is an enlarged fragmentary sectional view on the line 3—3 of Figure 2;

Figure 4 is a somewhat diagrammatic view illustrating the manner in which the livestock gain access to the salt of the block; and Figure 5 is a sectional view taken longitudinally through a partially used block illustrating the way in which the protective covering of the block continues to perform its function as the salt is licked away by the livestock.

According to my invention I propose to incorporate a variety of formulas or mixtures of common salt with other minerals and materials in a combination block and container as illustrated in Figures 1 and 2 of the drawings. The salt portion of the block is indicated by the numeral 10 and the main covering of the block is indicated by the numeral 11. The covering desirably is in the form of a bag and in cross section the block is essentially rectangular, being slightly wider than it is high. At one end, the block is rounded as indicated at 12 and the covering of the bag will have its seam 13 at the bottom shaped somewhat as indicated in Figure 1. The covering 11 is so constructed, particularly adjacent to its open end 14, as to make it much easier to tear circumferentially of the covering, that is, in a direction parallel to the open end 14, than it is to tear in a direction perpendicular to the open end. Various ways of accomplishing this result may be utilized. Where the bag is constructed of properly segregated and arranged paper fibers, the majority of the fibers can be run parallel to the open end of the bag with fewer cross fibers running in a direction perpendicular to the open end of the bag so as to provide a much greater resistance to tearing in one direction than in the other. In addition the bag can be provided with a tear prevention strip 15 near the open end of the block 10 so as to limit the extent of the tearing.

The block is longer than it is wide and preferably is made in a size comparable to the blocks currently used on the range, that is, a block weighing about fifty pounds. The covering 11 is extended beyond the end of the salt block 10. The extended portion is folded in and held in place by a gummed sheet 16 when the block is originally made. When the block is placed in the field this sheet 16 is removed and the extended portion of the covering is opened out as illustrated in Figure 2. A typical size of block is about eight and one-half inches wide, seven inches deep, and fourteen inches long. It need not be rectangular in cross section, and the essential feature of the bottom shape is that it must be tapered so the block will fall over when it is placed on the ground with the open end up.

In preparing the block I first provide a covering in bag form of a suitable water repellent or waterproof material. This bag is charged with the salt, or salt and other mineral composition and is placed in a press. Then pressure up to about 45 tons is applied to compress the salt and bag together and to form the bottom of the block, and the covering, to the desired tapered contour. The interior of the bag may have an adhesive of molasses or other edible material on its inner surface. The open end of the covering is then folded over and closed by the sheet 16.

The covering material must be such as to retain its strength when subjected to wetting by rain, snow, etc. as it is exposed to the weather. It must also prevent water from soaking through it and dissolving the salt. Various materials have been tried such as light weight aluminum and various laminated fibrous materials. A very successful covering bag comprises asphalt laminated, Sisal Kraft paper as shown in Figure 3. In this figure the covering is shown as comprising an outer layer of paper 17, asphalt 18 and an inner layer 19 of paper. The tape 15 is composed of two layers 15a and 15b secured together by waterproof cement indicated at 15c. High wet strength papers are obtainable and the asphalt layer between paper laminations keeps the rain from going through the covering and dissolving the salt.

The livestock will paw the block and bite it. It is essential therefore to protect the covering against tearing in a direction lengthwise of the block. By providing adequate strength of the covering material and a greater tear resistance in a lengthwise direction, I have been able to keep the covering from tearing open until practically all of the salt has been licked away. I find it advisable to use the strong strip 15 around the end of the container at the end of the block closest to the open end of the container. This strip may be a paper fiber such as that manufactured and sold as "Tape strap" by Mid-States Gumed Paper Company of Chicago, Illinois. It is not always essential that the strip 15 be used and with adequate lamination so that the fibers running around the block are at least predominantly greater than those running lengthwise to make it twice as hard to tear the covering lengthwise as it is to tear around the block, there is no necessity for the strip.

The composition and hardness of the salt block can be varied to suit different conditions without adversely affecting the protection afforded the block against the weather. It is not necessary to have the extreme hardness of the blocks now commonly used on the range. Calcium salts, magnesium salts, iodine and other materials can be incorporated in the block since they will not be leached out by the rain and snow.

When the block is in the field the livestock will often tip it up in the manner disclosed in Figure 4 the free end portion 14 of the covering will be pushed back and spread, then gradually torn by the animals. As the salt is licked away, the covering will tend to crush or fold upon itself to shorten the distance from the open end of the covering to the exposed surface of the salt. If the salt becomes hollowed out too greatly in the center, it will break inwardly of the covering so as to become available within the container. I have found that the animals will remove the salt almost completely from the container before the small remaining portion of salt will break up and even this small remaining portion of the salt is within the container where it is at least partially protected.

In the claims and in this description, I refer to the block of material that is mounted in the covering as a "salt block." It should be understood that this term "salt block" includes ordinary salt such as is used for livestock without the addition of other materials, and blocks comprising salt and various other materials such as iodine and minerals that may be added.

It is believed that the nature and advantages of my invention will be apparent from the foregoing description. Having thus described my invention, I claim:

1. An all weather salt block comprising an oblong solid block of salt tapered at one end to prevent standing the block on said tapered end on a flat surface, and a water proof covering in which said block is compressed, said covering completely enclosing the tapered end of the block and the surface of the block to the end thereof opposite the tapered end and projecting therebeyond, said covering including strengthening means extending circumferentially of the block to make the tear strength of the covering lengthwise of the block toward the tapered end much greater than the tear strength in a transverse direction.

2. An all weather salt block for livestock comprising salt and a water repelling covering adhered together into a solid oblong block, the block having one end tapered to prevent the block from setting upright on said end, the opposite end face of the block having the salt exposed so the livestock may lick it.

3. An all weather salt block for livestock comprising salt and a flexible waterproof covering adhered together into a solid oblong block, the block having one end tapered to prevent the block from setting upright on said end, the opposite end face of the block having the salt exposed so the livestock may lick it.

4. An all weather salt block for livestock comprising salt and a water repelling covering compressed together into a solid oblong block, the block having one end tapered to prevent the block from setting upright on said end, the opposite end face of the block having the salt exposed so the livestock may lick it, the covering having much greater tear strength lengthwise of the block than in a direction around the block at the end where the salt is exposed.

5. An all weather salt block for livestock comprising salt and a water repelling covering compressed together into a solid oblong block, the block having one end tapered to prevent the block from setting upright on said end, the opposite end face of the block having the salt exposed so the livestock may lick it, and the covering having a free portion extended beyond the said opposite end to shelter the exposed salt.

6. An all weather salt block for livestock comprising salt and a water repelling covering compressed together into a solid oblong block, the block having one end tapered to prevent the block from setting upright on said end, the opposite end face of the block having the salt exposed so the livestock may lick it, the covering having a free portion extended beyond the said opposite end to shelter the exposed salt, and a band of tape around the block at the exposed end adhered to the covering.

7. An all weather salt block for livestock comprising salt and a flexible waterproof covering compressed together into a solid oblong block, the block having one end tapered to prevent the block from setting upright on said end, the opposite end face of the block having the salt exposed so the livestock may lick it, and the covering having a free portion extended beyond the said opposite end to shelter the exposed salt, the covering including an edible adhesive lining to which the salt adheres.

HOMER FUTTER.

References Cited in the file of this patent

UNITED STATES PATENTS

| Number | Name | Date |
| --- | --- | --- |
| 382,048 | Lindner et al. | May 1, 1888 |
| 506,982 | Diamond | Oct. 17, 1893 |
| 797,167 | Beyea | Aug. 15, 1905 |
| 803,851 | Pyle | Nov. 7, 1905 |
| 1,705,970 | Ford | Mar. 19, 1929 |
| 1,729,213 | Ford | Sept. 24, 1929 |
| 1,815,652 | Gring | July 21, 1931 |
| 1,913,531 | Block | June 13, 1933 |